United States Patent [19]

Nishida et al.

[11] Patent Number: 5,181,417
[45] Date of Patent: Jan. 26, 1993

[54] PRESSURE DETECTING DEVICE

[75] Inventors: Minoru Nishida, Okazaki; Naohito Mizuno, Aichi; Yoshinori Ohtsuka, Okazaki; Tadashi Ozaki, Gamagori; Hiroshi Uesugi, Okazaki, all of Japan

[73] Assignees: Nippon Soken, Inc., Nishio; Nippondenso Co., Ltd., Kariya, both of Japan

[21] Appl. No.: 807,629

[22] Filed: Dec. 13, 1991

Related U.S. Application Data

[63] Continuation of Ser. No. 550,758, Jul. 10, 1990, abandoned.

[30] Foreign Application Priority Data

| Jul. 10, 1989 | [JP] | Japan | 1-178636 |
| Jul. 11, 1989 | [JP] | Japan | 1-178440 |
| Aug. 8, 1989 | [JP] | Japan | 1-205095 |
| May 21, 1990 | [JP] | Japan | 2-130530 |

[51] Int. Cl.$^5$ ............................................. G01M 15/00
[52] U.S. Cl. ............................................. 73/115
[58] Field of Search ............... 73/35, 115, 720, 721, 73/723-727; 338/42

[56] References Cited

U.S. PATENT DOCUMENTS

| 3,204,463 | 9/1965 | Taber | 73/726 |
| 4,023,562 | 3/1977 | Hynecek et al. | 73/727 |
| 4,411,158 | 10/1983 | Schaff, Jr. | 73/727 |
| 4,500,864 | 2/1985 | Nakane et al. | 73/726 |
| 4,620,438 | 11/1986 | Howng | 73/35 |
| 4,774,843 | 10/1988 | Ghiselin et al. | 73/727 |
| 4,965,777 | 10/1990 | Timossi et al. | 73/727 |
| 4,967,600 | 11/1990 | Keller | 73/727 |

FOREIGN PATENT DOCUMENTS

| 58-103632 | 6/1983 | Japan . |
| 58-103633 | 6/1983 | Japan . |
| 58-103635 | 6/1983 | Japan . |
| 58-103636 | 6/1983 | Japan . |
| 60-97676 | 5/1985 | Japan . |
| 62-259475 | 11/1987 | Japan . |
| 62-291534 | 12/1987 | Japan . |
| 62-293131 | 12/1987 | Japan . |
| 0061640 | 3/1989 | Japan | 73/720 |
| 1-284726 | 11/1989 | Japan . |
| 1-284727 | 11/1989 | Japan . |

*Primary Examiner*—Robert Raevis
*Attorney, Agent, or Firm*—Cushman, Darby & Cushman

[57] ABSTRACT

A device for detecting pressure of a high temperature pressurized fluid. A sensing element having a diaphragm adjacent to one end and a lead wire outlet adjacent to another end in the longitudinal direction of a rectangular parallelopiped configuration of the sensing element including the diaphragm. Thus, the lead wire outlet is a predetermined distance from the diaphragm heated by high temperature fluid. This prevents the lead wire outlet and the other electrical assemblies from suffering deterioration or misoperation caused by high temperature. The reliability of the pressure detecting device can be improved.

22 Claims, 14 Drawing Sheets

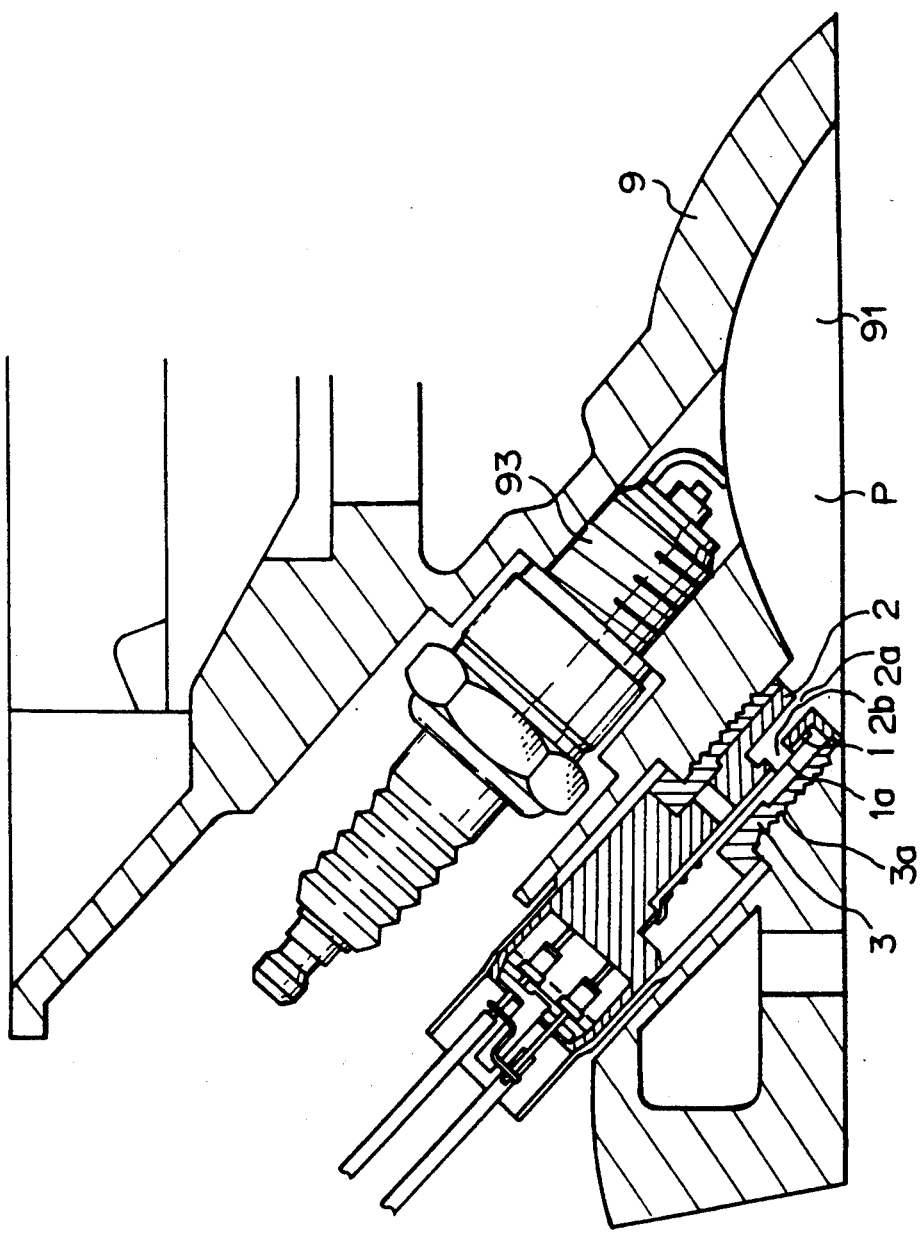

PRESSURE DETECTING DEVICE

This is a continuation of application Ser. No. 07/550,758, filed on Jul. 10, 1990, which was abandoned upon the filing hereof.

BACKGROUND OF THE INVENTION

1. Field of the Invention

The present invention relates to a pressure detecting device, and in particular to a pressure detecting device for measuring the pressure of a high temperature fluid, for example, suitable for measuring the combustion pressure in an internal combustion engine.

2. Description of the Related Art

As the general structure of a conventional pressure detecting device, there is known one which comprises a cylindrical housing secured on a pressure chamber wall; a metallic sensing unit which is disposed at an opening at one end of the housing so as to face the inside of the pressure chamber, and a pressure receiver having a strain gauge element disposed in the sensing unit; an output signal being obtained responsive to deformation caused in the pressure receiver.

FIG. 1 is an illustration of an example of a conventional pressure detecting device. The example shows a cylindrical housing 3' which is secured in a pressure chamber wall using a threaded portion 3a' at the outer circumference of a smaller diameter part of the housing. A sensing body 2' provided with an opening 2a' in its side wall is held air-tightly at the front opening of the housing 3'. A diaphragm formed of a ceramic plate is disposed on the opening 2a' for receiving pressure, and a semiconductor strain gauge element (not shown) is secured to the inside surface of the diaphragm 1'.

The strain gauge element is connected to electrodes of a terminal plate 9 through wire 4. An output signal of the strain gauge element is taken out to the outside via the terminal plate 9', a lead pin 91', and lead wire 6'.

In the above conventional pressure detecting device, however, even the wire 4', terminal plate 9', lead pin 91', and other parts which take out the output signal from the strain gauge element are inserted into the high temperature pressure chamber. In particular, the bonding assembly including the wire 4' between the diaphragm 1' and the terminal plate 9' is exposed to high temperatures. Accordingly, reliability of the bonding assembly cannot be ensured.

On the other hand, in an apparatus of this kind, the sensing unit is constituted by a so-called SOI structure of semiconductor strain gauge elements made of monocrystalline or polycrystalline silicon formed on an insulative substrate. Since this kind of apparatus does not have a PN junction as do diffusion type gauges, there is no leakage current at a high temperatures and it is possible to detect pressure at high temperature environment of more than 200° C.

As a sensing unit with an SOI structure, there is known one which uses monocrystalline silicon as the insulative substrate, on which semiconductor strain gauge elements made from monocrystalline or polycrystalline silicon are formed through insulative layers.

However, in the conventional art, metal is used for the housings, etc., of high temperature pressure detecting devices. For this reason, in a pressure detecting device using a silicon substrate as an insulative substrate there has been the problem that it is impossible to achieve a high sealing properly in bonding the silicon substrate and the metallic housing unless use is made of glass bonding, which is not that strong in bonding strength.

SUMMARY OF THE INVENTION

In view of the above problem, the present invention has as its object to provide a pressure detecting device capable of avoiding deterioration of the reliability at the lead wire outlet due to high temperatures.

In the present invention, in order to achieve the above object, provision is made of a pressure detecting device which directly faces high temperature pressurized medium circumstances the inside of a pressure chamber filled with a high temperature pressurized medium and detects the pressure of the pressurized medium, the pressure detecting device comprising:

a cylindrical housing wherein components for measuring the pressure of the pressurized medium are accommodated;

an element holder constituting a pressure passage which is held at the front of the cylindrical housing and which conducts the pressurized medium into the housing;

a semiconductor strain gauge for detecting pressure of the pressurized medium conducted into the pressure passage;

a sensing element which is secured to the element holder and has a pressure receiving diaphragm with semiconductor strain gauge elements formed on one of its major faces, the sensing element extending in one direction and having a oblong shape with a first end and a second end facing each other at a predetermined distance in the longitudinal direction, the pressure receiving diaphragm being formed near the first end so as to contact the high temperature pressurized medium;

a lead wire outlet arranged as a specified distance from the pressure receiving diaphragm, so as to reduce deterioration caused by the high temperature of the pressurized medium, near the second end of the sensing element; and wiring means for connecting the semiconductor strain gauge element formed at the pressure receiving diaphragm to the lead wire outlet.

More specifically, in the present invention, in detecting the fluid pressure of a high temperature fluid in an internal combustion engine etc. in order to prevent the bonding assembly and wiring from deteriorating due to high temperature, the pressure detecting device is constructed so that the sensing element including the diaphragm is formed as a rectangle; the diaphragm unit and the lead wire outlet are positioned adjacent to a first end and the second end opposing each other at a predetermined distance in the longitudinal direction; and the sensing element is mounted on the housing so that its longitudinal direction conforms with that of the pressure detecting device. Thus, even if the diaphragm near to the first end is exposed to high temperature pressurized fluid, the lead wire outlet near the second end located at the opposite side and the lead wire connected thereto do not directly receive the effects of the high temperature pressurized fluid. Due to the above described arrangement, the reliability of the pressure detecting device under high temperature conditions can be improved.

BRIEF DESCRIPTION OF THE DRAWINGS

FIG. 2C is a sectional view of an example wherein a pressure detecting device is mounted on a engine cylinder head according to the present invention;

DESCRIPTION OF THE PREFERRED EMBODIMENTS

Figure 1:
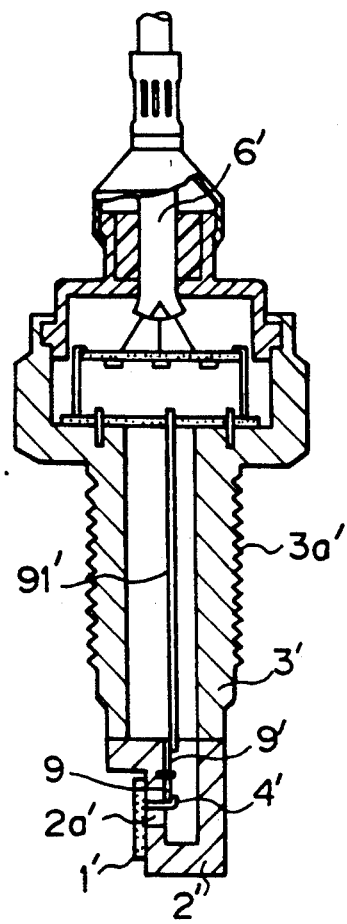
FIG. 1 is a cross-sectional view illustrating a conventional pressure detecting device.

Concrete constitutions of a pressure detecting device according to the present invention will now be described referring to the drawings.

EXAMPLE 1

In this example, a sensing element is arranged in a space between an element holder, having a pressurized fluid passage, and a housing.

Figure 2A:
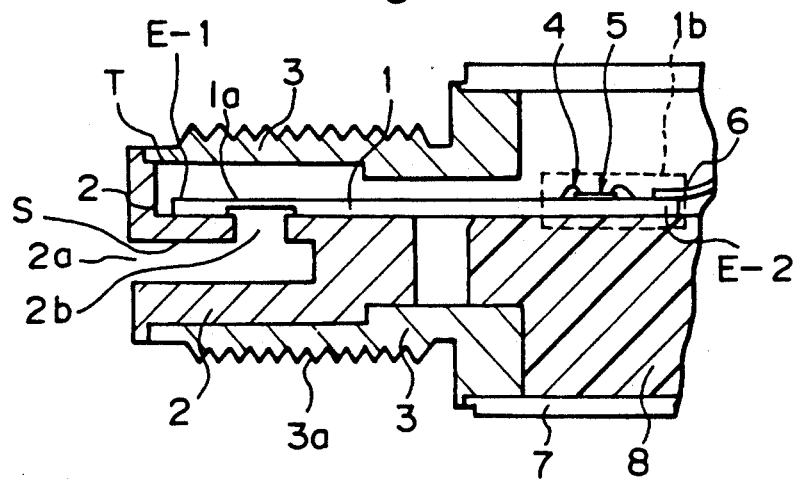
FIG. 2A is a sectional view illustrating a principal structure of one embodiment according to the present invention.

FIG. 2A is a sectional view illustrating a principal structure of one example according to the present invention. In the drawing, the pressure detecting device comprises: a housing 3 whose front T faces the inside of a pressure chamber P; an element holder 2, which is held air-tight at the front T of the housing 3 and which has an opening 2b at a side wall S of the pressurized fluid passage 2a; a sensing element 1 for detecting fluid pressure conducted to the pressure passage 2a, the sensing element 1 being secured at the opposite side surface of the pressure passage 2a of the element holder 2 so as to cover air tightly the opening 2b, and a pressure receiving diaphragm 1a for receiving fluid pressure arranged on the opening 2b. A semiconductor strain gauge is formed on a surface of the diaphragm. The sensing element 1 is formed in a shape having a predetermined length in the longitudinal direction. A first end E-1 is used for the pressure receiving diaphragm 1a. A second end E-2 is used for a lead wire outlet. Wiring is formed toward the other end of the sensing element.

In this pressure detecting device, the fluid pressure of the high temperature fluid causes the surface of the pressure receiving diaphragm to deform, and an output signal in accordance with deformation strain is generated from the semiconductor strain gauge. At this time, the diaphragm is exposed to a high temperature due to the heat of the high temperature fluid. However, since the sensing element is of a shape of a predetermined length in the longitudinal direction, with one end, the first end, made the pressure receiver, and the another end, the second end, made the lead wire outlet, the end of the sensing element comprising the lead wire outlet does not become high in temperature, so the effects of the heat of the high temperature fluid can be suppressed. Accordingly, deterioration of the reliability at the lead wire outlet due to high temperature can be avoided.

A more detailed description of the example follows: Referring to FIG. 2A, the cylindrical housing 3 has a larger diameter right end (in the drawing). On the other circumference of the housing 3 is formed a threaded portion 3a. An element holder 2 having a cylindrical shape with one end closed is inserted in the opening at the left end and secured by welding.

The element holder 2 is made of an Fe-Ni-Co alloy having a small heat expansion coefficient. The inside of the element holder 2 forms a pressure conducting port 2a having front inlet. An opening 2b is provided in the side wall S of the pressure conducting port 2a.

The sensing element 1 is constructed from a sapphire substrate, an oxide monocrystalline substrate. The sensing element 1 is firmly secured in the opening 2b of the element holder 2 by brazing so as to plug the opening 2b. This is done before welding the holder 2 to the housing 3. A concavity U of a thinner thickness is formed in the sensing element 1 centered at the opening 2a and serves the pressure receiving diaphragm 1a.

In this example, the concavity U is formed on the part of the diaphragm 1a which contacts the high pressure fluid. However, this concavity U is not always necessary. As described later, a diaphragm may be formed without any concave portion.

Figure 3:
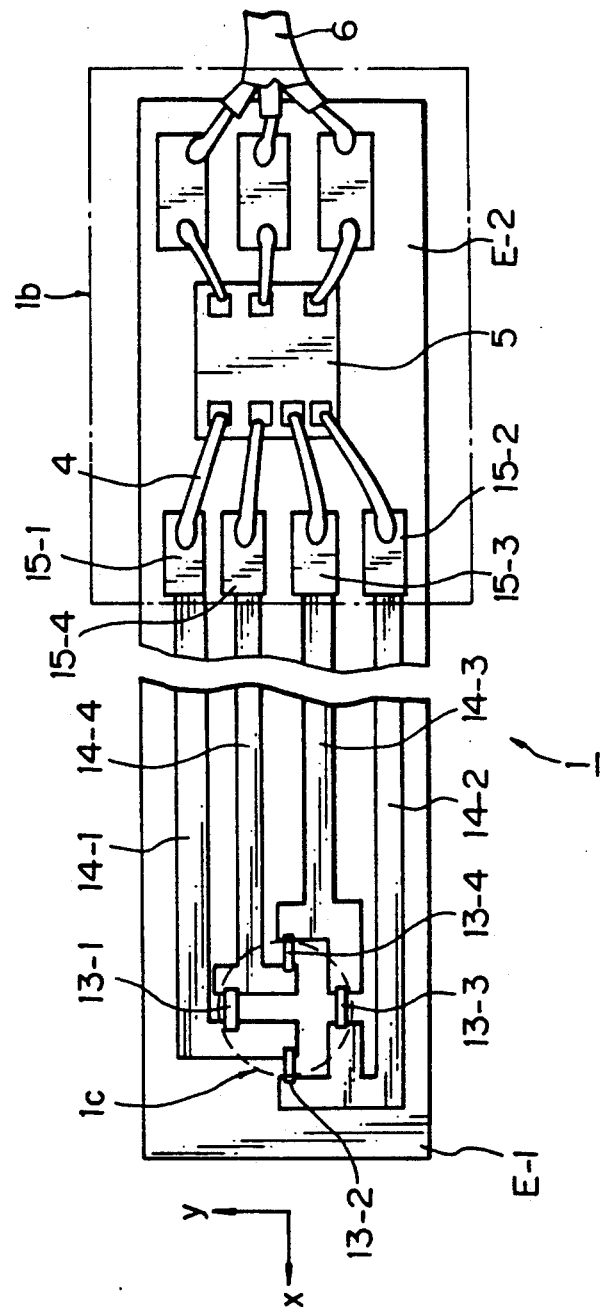
FIG. 3 is an illustration of wiring in the pressure detecting device in the present invention.

FIG. 3 is an illustration of the wiring in the pressure detecting device in the present invention.

The sensing element 1 is made by processing a sapphire substrate and has an elongated oblong shape. The pressure receiving diaphragm 1a is positioned close to one end, that is, the first end E-1, of the sensing element 1. Pad assemblies 15-1, 15-2, 15-3, 15-4 and a circuit chip 5 are provided close to the other end, that is, the second end E-2, as a lead wire outlet. The sensing element 1, as shown in FIG. 3, formed by a so-called SOS (silicon on sapphire) structure, and semiconductor strain gauges 13-1, 13-2, 13-3, 13-4 made of p-type mono-crystalline layers obtained by vapor deposition and of doping impurities.

The semiconductor has a planar orientation of (100), the longitudinal direction of the semiconductor strain gauges is [110] of (110), that is, the direction x shown in FIG. 3.

Figure 5:
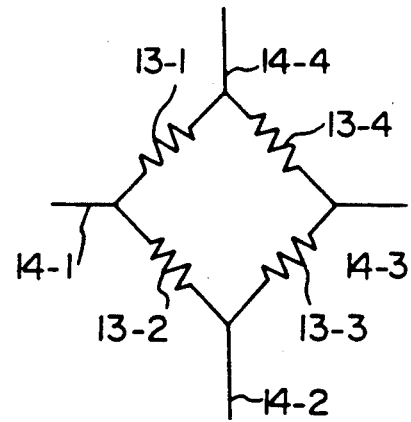
FIG. 5 is a circuit diagram of a bridge circuit according to the present invention.
Figure 6:
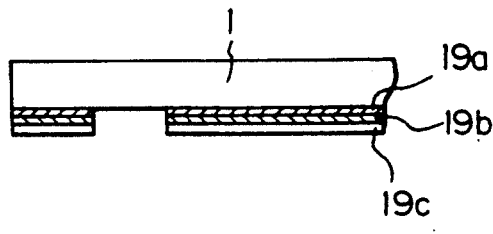
FIG. 6 is an illustration of another example of a diaphragm in the present invention.

FIG. 5 is a circuit diagram of a bridge circuit according to the present invention. The semiconductor strain gauges 13-1 to 13-4 are arranged just above a peripheral edge of the diaphragm 1a and are connected with each other through both a thin metallic layer of Pt, etc., arranged on the sapphire substrate and lead electrodes 14-1, 14-2, 14-3, 14-4 consisting of thin silicon layers.

A lead wire outlet 1b is mounted on the second end E-2, that is, the right end of the sensing element 1 in FIG. 3. The pad assemblies 15-1, 15-2, 15-3, 15-4 consisting of metallic electrodes are arranged on the lead wire outlet 1b. Wiring is formed on parallel in the right-left direction from the diaphragm 1a to the lead wire outlet 1b so that the lead electrodes 14-1, 14-2, 14-3, 14-4 are connected to the pad assemblies 15-1, 15-2, 15-3, 15-4. Further, the pad assemblies 15-1, 15-2, 15-3, 15-4 are bonded to a signal use IC circuit chip 5, secured to the lead wire outlet 1b of the sensing element 1, by wires 4. The IC circuit 5 includes an amplifier circuit and a temperature compensating circuit and is connected to the outside through a lead wire 6.

Figure 2B:
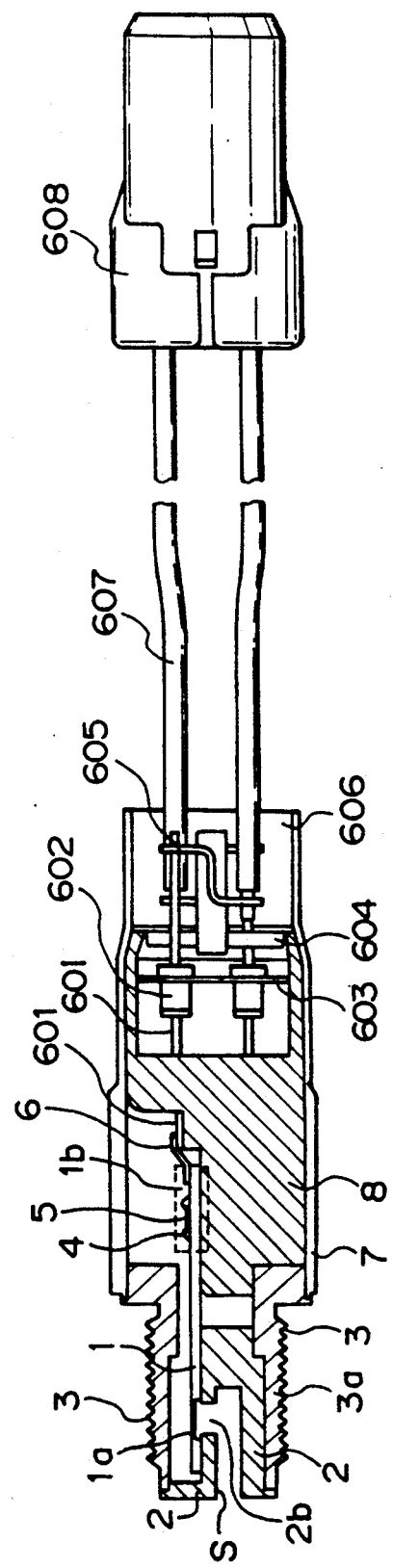
FIG. 2B is a sectional view illustrating the entire construction of an embodiment of the pressure detecting device including the principal structure as shown in FIG. 2A.

FIG. 2B is a sectional view illustrating the entire construction of the embodiment of the pressure detecting device including the principal structure as shown in FIG. 2A. In the drawing, the lead wire 6 is connected through lead pins 601, bus bar capacitors 602 for preventing electrical noise, lead pins 605, and external lead wires 607, to a connector 608 and from there to the outside.

High temperature fluid pressure acts on the diaphragm 1a to induce stress corresponding to the fluid pressure. This causes deformation of the diaphragm and the changes the resistance values of the semiconductor strain gauges. Also, the bridge circuit shown in FIG. 5 varies in electrical balance. A constant current or constant voltage is applied to the pad assemblies 15-1, 15-3. Output corresponding to pressure on the diaphragm 1a appears on the pad assemblies 15-2, 15-4 depending on the change in balance of the bridge circuit. This is amplified and subjected to temperature compensation by a signal processing IC circuit chip 5 to give an output signal corresponding to the measured pressure. Note a temperature compensating circuit compensates for changes in resistance characteristics of the semiconductor strain gauge elements accompanying temperature changes of the diaphragm 1a.

Figure 4:
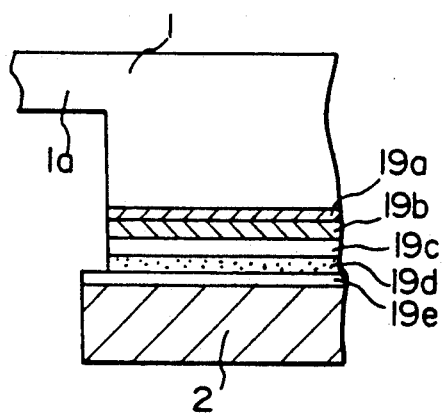
FIG. 4 is an illustration showing a bonding assembly of a sensing element and an element holder or a pressure detecting device according to the present invention.

FIG. 4 is an illustration showing the bonding assembly of the sensing element and the element holder of the pressure detecting device according to the present invention. The sensing element 1 contacts the element holder 2 at its back surface other than the diaphragm 1a. A Ti metallised layer 19a, Mo metallized layer 19b and Ni plating layer 19c are formed on this contact surface. The sensing element 1 is secured to the element holder 2 at the contact surface through a brazing layer 19d of Ag paste. Since the Ni plating layer 19e is formed at the brazing portion of the element holder 2, the bond made by the brazing is strong. That is, even if a high pressure acts on the sensing element, the seal between the sensing element 1 and the element holder 2 is maintained, so it is possible to accurately measure the pressure under high temperature and high pressure conditions.

Referring to FIG. 2A, a cylindrical cover 7 is secured on the housing 3 by weld. The sensing element 1 is supported at the right end thereof by a holder member 8 secured to the cover 7 and the housing 3.

As is apparent from FIG. 2B, the right open end of the cylindrical cover 7 is tightly sealed by resin 606. The external lead wire 607 is supported by a wire holder 604 and extends through the resin 606 to the outside of the pressure detecting device. In the drawing, 603 denotes a seal plate on which the capacitors 607 are secured by brazing, and 608 is a connector.

In this pressure detecting device, the diaphragm 1a of the sensing element is exposed to high temperatures, but due to the elongated oblong shape of the sensing element 1, the temperature at other end of the element 1 where the lead outlet 1b and the IC circuit chip 5 are arranged does not become that high and can be kept low. The thermal conductivity of sapphire is lower than that of the Fe-Ni-Co alloy of the element holder 2, even if heat of the high temperature fluid is transferred to the diaphragm 1a, it diffuses to the element holder 2. At this time, the metallized layers, plating layers, and brazing layers function as heat diffusing layers having an excellent thermal conductivity. For this reason, the circuits in the IC circuit chip 5 will not erroneously operate due to high temperatures and, further, it is possible to avoid deterioration of the reliability in the case of temperature rises at the pad assemblies 15-1 to 15-4 of the lead outlet 1b.

Note there is no problem with the heat resistance of the silicon semiconductor strain gauges 13-1 to 13-4 formed on the diaphragm 1a.

Since a sapphire substrate superior in heat resistance is used for the sensing element 1 and semiconductor strain gauge elements comprised of a monocrystalline silicon layer are formed on the sapphire substrate, even in use under high temperatures (more than Curie point 150° C.), there is never the problem of a leakage current being generated at a PN junction as in a diffusion gauge formed by diffusing impurities in a silicon substrate. Thus, measurement of high pressures under high temperatures can be performed with a high sensitivity.

Since the heat expansion coefficients of the sapphire of the sensing element 1 and the Fe-Ni-Co alloy of the element holder 2 are close, the so-called bimetal effect arising from a difference of expansion coefficients is small, which is advantageous in the case of thermal shock.

Since the signal processing IC circuit chip 5 is secured on the sensing element 1, the S/N ratio with respect to electrical noise is better than in a conventional device wherein the output of a bridge circuit comprised of semiconductor strain gauge elements is taken out as is to the outside.

The sensing element 1 may be one as shown in FIG. 5 where the pressure receiving area is flat with no concavity. In this case too, Ti, Mo, and Ni metallized layers 19a, 19b, 19c are formed at the junction with the element holder. Since the pressure receiving part, is not specially processed to make a concavity, the number of manufacturing steps can be cut and costs reduced.

Note that while, in the above example, the IC circuit chip 5 was secured to the sapphire substrate, it may be formed by an SOS structure in the same way as the semiconductor strain gauge elements.

FIG. 2C is a sectional view of an example of a pressure detecting device mounted on an external wall 9 of an engine cylinder head. In the drawing, the pressure detecting device is fixed adjacent to a spark plug 93 at the external wall 9 of the engine cylinder head by means of the thread portion 3a on the outer surface of the housing of the device. Therefore, high pressure fluid inside an engine cylinder 91 is conducted into the pressure inlet port S of the element holder 2. The diaphragm 1a detects the pressure of the high temperature fluid and transmits the results to the processing circuit 5. After processing there, the result is transmitted through the connector 608 to a external engine control circuit.

In this example, for instance, by controlling the air/fuel ratio in lean combustion control from the stoichiometric air/fuel ratio to the lean region by the pressure in the engine, the $O_2$ sensor, knocking sensor, and the like required in conventional lean control become unnecessary.

EXAMPLE 2

In Example 1, use was made of a sensing element 1 made of a sapphire substrate on one side of which semiconductor strain gauge elements 11 to 14 were formed or having a concavity U at a part contacting the high temperature pressure fluid, on the opposite side from where the semiconductor strain gauge elements are formed, so as to form a thin portion and increase the sensitivity.

However, not only does a diaphragm having a concavity entail complicated manufacturing procedures, but also it is difficult to form a uniform, accurate concavity; it is difficult to produce pressure detecting devices having high performance and reliability, and therefore production costs rise.

On the other hand, as described earlier, there is known an SOI structure sensing unit wherein semiconductor strain gauge elements made of monocrystalline silicon or polycrystalline silicon are formed on a monocrystalline silicon substrate through an insulative layer. However, metal was used in the housing of the high temperature pressure detecting device, and thus, use of a silicon substrate limited the bonding between the substrate and the housing to glass bonding, which is not that strong, and meant a high sealing property could not be realized.

Instead of this, it has been proposed to use an oxide monocrystalline substrate such as sapphire, spinel, and magnesia since these can be firmly secured by brazing to a metallic housing.

However, chemical etching cannot be used for oxide monocrystalline substrates unlike with monocrystalline silicon substrates and thus machining has to be used.

Figure 7:
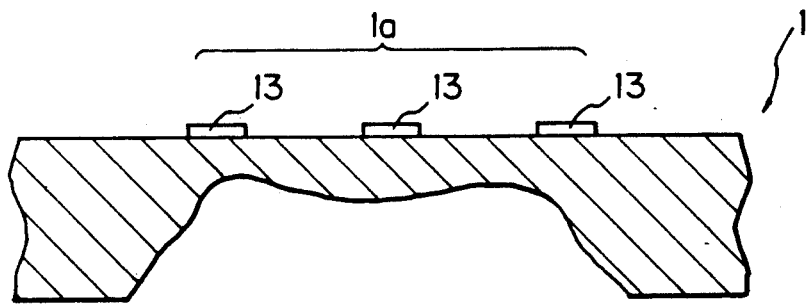
FIG. 7 is an illustration indicating a problem in a conventional diaphragm.

FIG. 7 illustrates a problem in processing of a conventional diaphragm. Consider the processing of a pressure detecting device based on a similar concept as the prior art but using one of these new substrates. To form the thin diaphragm one must cut from the back side of the substrate by a drill, etc. As shown in FIG. 7, the shape precision is inevitably degraded. Along with this, there is tremendous variation in the stress applied to the semiconductor strain gauge elements 13 formed on the diaphragm surface, resulting in fluctuations in the output of the pressure detecting device.

In the second example of the present invention, these problems are eliminated by selection of the materials and use of bonding techniques so as to efficiently form a precision diaphragm and thereby produce a reliable pressure detecting device.

That is, the sensing element 1, including the diaphragm, uses a plurality of oxide monocrystalline substrates able to be strongly secured to a metallic housing. These are bonded together to form the sensing element 1.

Figure 8:
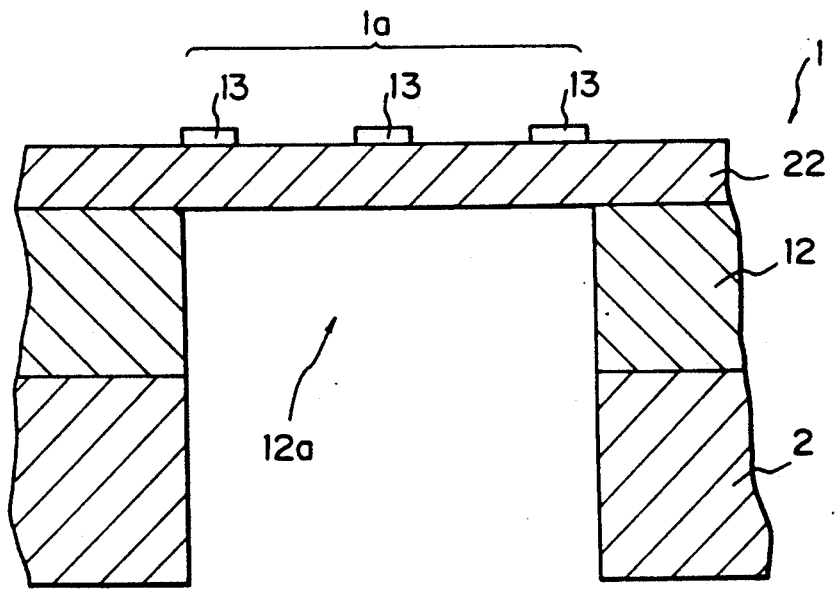
FIG. 8 is an illustration showing a diaphragm structure using a bonding means in the present invention.

FIG. 8 show a diaphragm structure using the bonding means. In the drawing, the sensing element 1 includes a first oxide monocrystalline substrate 12 having a through hole 12a at a predetermined position; a plate-shaped second oxide monocrystalline substrate 22 bonded on the first oxide monocrystalline substrate 12 and constituting the diaphragm 1a at a predetermined position; and semiconductor strain gauge elements 13 on the end surface of the side of the second oxide monocrystalline substrate 22 opposite to that bonded to the first oxide monocrystalline substrate 12 and at the diaphragm 1a.

Due to this construction, as shown in FIG. 8, the diaphragm 1a is made by bonding the first oxide monocrystalline substrate 12 having the through hole 12a at a predetermined position and the plate-shaped second oxide monocrystalline substrate 22.

For this reason, the dimensional accuracy of the diaphragm 1a is determined just by the accuracy of processing the through hole 12a of the first oxide monocrystalline substrate 12 and the accuracy of thickness of the second oxide monocrystalline substrate 22, making possible higher dimensional precision. Therefore, the variation of the stress on the semiconductor strain gauge elements 13 on the diaphragm is suppressed and therefore the variation of output values from the semiconductor strain gauge elements 13 is suppressed.

Also, as mentioned before, since use is made of oxide monocrystalline substrates strong bonding to the metallic housing is possible and an excellent seal can be obtained.

Figure 9:
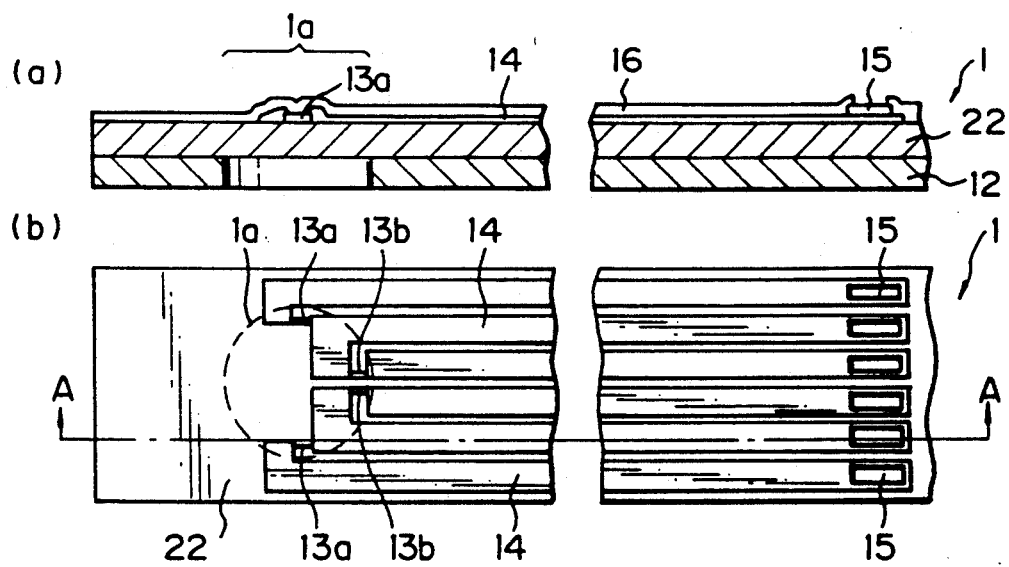
FIG. 9 is an illustration of the wiring of the diaphragm structure as shown in FIG. 8.

FIG. 9 is an illustration of the wiring of the diaphragm structure shown in FIG. 8. In this example, when the diaphragm 1a has a concavity, the sensing element may be as shown in FIGS. 9A and 9B. FIG. 9A is a sectional wiring view taken along line A—A of FIG. 9B, and FIG. 9B is a plan wiring view illustrating the diaphragm structure.

In the drawing, the sensing element 1 is given a thin diaphragm 1a by bonding a plate-shaped sapphire substrate 22 on a sapphire substrate 12 with a through hole. Note the diaphragm 1a is formed at one longitudinal end of a rectangular parallelopiped sensing element 1. At the other end are a pad assembly 15 and an IC circuit chip 5 forming a lead wire outlet region.

Upon action of a high temperature fluid pressure on the diaphragm 1a in the sensing element 1, stress corresponding to the fluid pressure acts on the diaphragm 1a in the same manner as in the above example. Such stress deforms the diaphragm and causes the semiconductor strain gauge elements to issue output signals corresponding to the stress, that is, deformation strain of the diaphragm. Here, the sensing element 1 is a bonded substrate of the plate-shaped substrate 22 and the substrate 12 with the through hole, and thus the sensing element 1 is made with a high dimensional accuracy. Therefore, variation of stress due to the position of the gauge element is markedly reduced in the semiconductor strain gauge elements 13a and 13b, both formed on the surface of the diaphragm 1a. Accordingly, the variation in output values from the semiconductor strain gauge elements 13a and 13b also becomes smaller.

Figure 10:
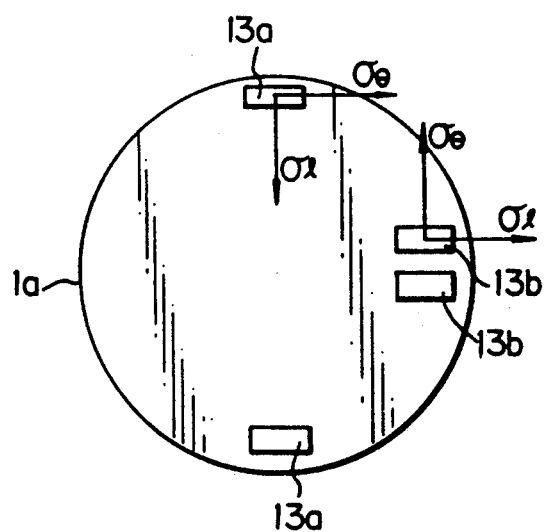
FIG. 10 is an illustration of the operation of a semiconductor strain gauge element in the present invention.

FIG. 10 is an illustration of the principle and operation of a semiconductor strain gauge element in the present invention. The drawing shows the arrangement of the semiconductor strain gauge elements 13a and 13b.

The tangential stress $\sigma_\theta$ of the diaphragm 1a acts on the semiconductor strain gauge element 13a in the longitudinal direction thereof. The radial stress $\sigma_\theta$ of the diaphragm 1 acts on the semiconductor strain gauge element 13a in the direction perpendicular to the longitudinal direction. A stress $\sigma_\theta$ of the diaphragm 1 acts on the semiconductor strain gauge element 13b in the longitudinal direction thereof. A stress $\sigma_\theta$ of the diaphragm 1 acts on the semiconductor strain gauge element 13b in the direction perpendicular to the longitudinal direction. The piezo resistance coefficients $\pi_l$, $\pi_t$ in the [110] direction of the (100) plane for p-type monocrystalline silicon have the following relationship:

$$\pi_l \approx -\pi_t$$

(where $\pi_l$ is an ordinate coefficient, and $\pi_t$ is an abscissa coefficient).

The amount of variation of the resistance due to the stress on the semiconductor strain gauge elements 13a and 13b is represented as follows:

$$\frac{\Delta Ra}{Ra} = \pi_l \sigma_\theta + \pi_t \sigma_l \approx \pi_l \sigma_\theta - \pi_l \sigma_l$$

$$\frac{\Delta Rb}{Rb} = \pi_l \sigma_l + \pi_t \sigma_\theta \approx \pi_l \sigma_l - \pi_l \sigma_\theta$$

Where Ra and Rb are resistance values of the semiconductor strain gauge elements 13a and 13b. The resistance values the semiconductor strain gauge elements 13a and 13b change inversely to each other. As shown in FIG. 5, if a bridge circuit is provided, the balance in the bridge circuit varies with the change of resistance of the semiconductor strain gauge elements due to applied stress. A constant voltage or a constant current is applied to the bridge circuit, and the changes in resistance are generated as output signals.

Figure 11:
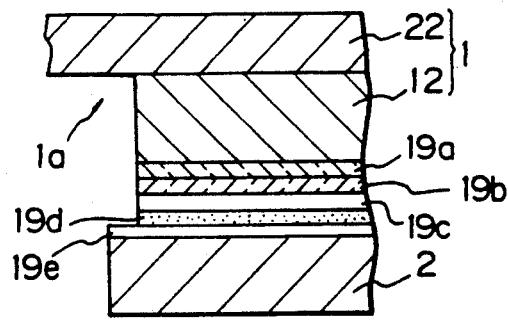
FIG. 11 is an illustration showing another bonding assembly of the sensing element and the element holder of the pressure detecting device according to the present invention.

FIG. 11 is an illustration of another bonding assembly of the sensing element and the element holder. The back side surface of the sensing element 1 other than the diaphragm 1a, that is, the surface of the sapphire substrate 12 with the through hole contacting the element holder 2A has formed thereon a Ti metallized layer 19a, Mo metallized layer 19b, and Ni plating layer 19c. Further, an Ag paste brazed layer 19d is added, through which the sensing element is bonded to the element holder 2 in the same way as the prior example. In addition, an Ni plating layer 2b is formed at a brazing portion of the element holder 2. Accordingly, the brazing bonds are very strong.

Figure 12:
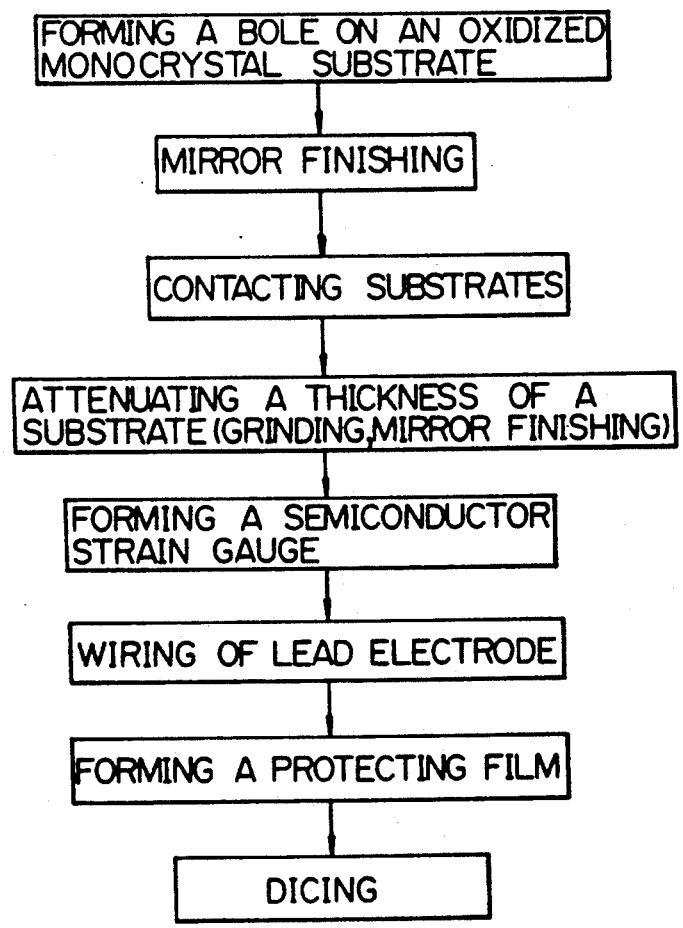
FIG. 12 is a process diagram illustrating the manufacturing process of a diaphragm in the present invention.
Figure 13:
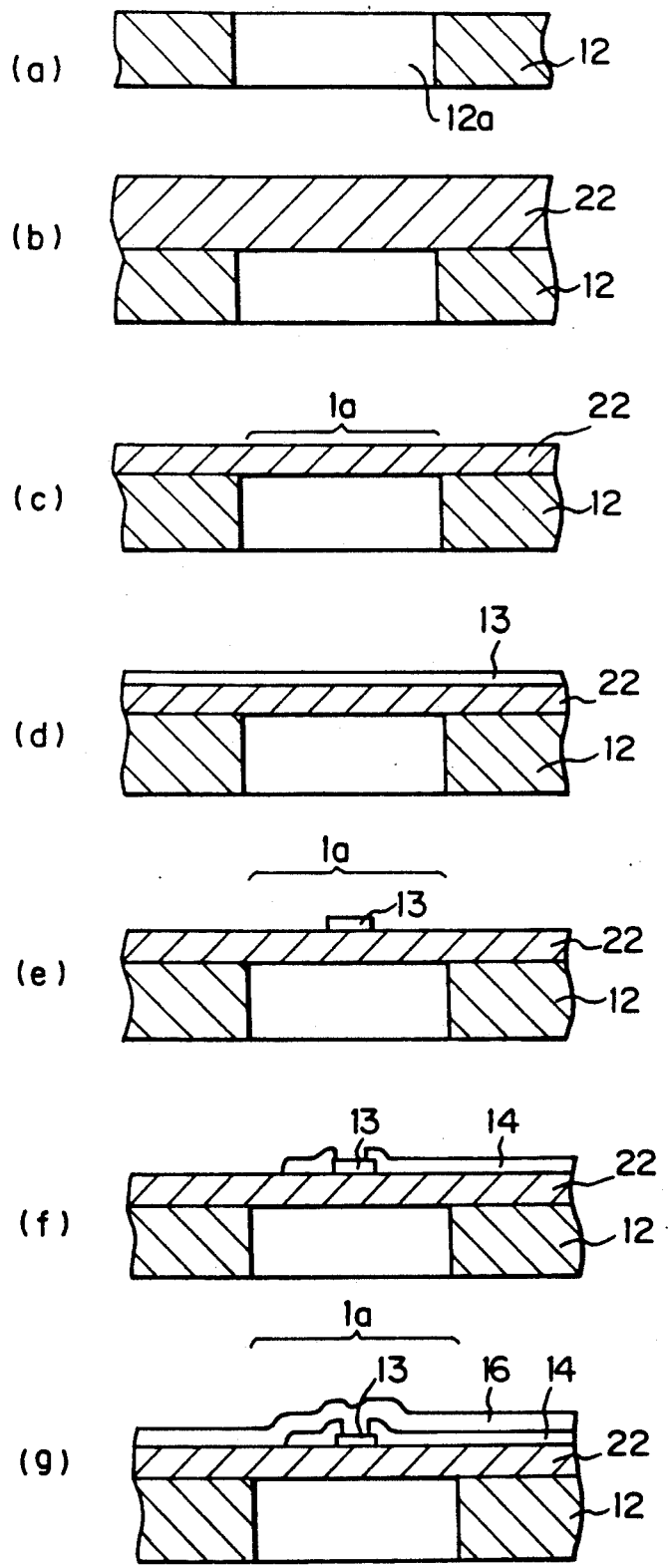
FIGS. 13a-13g are an illustration of the manufacturing process of the diaphragm in the present invention.
Figure 14:
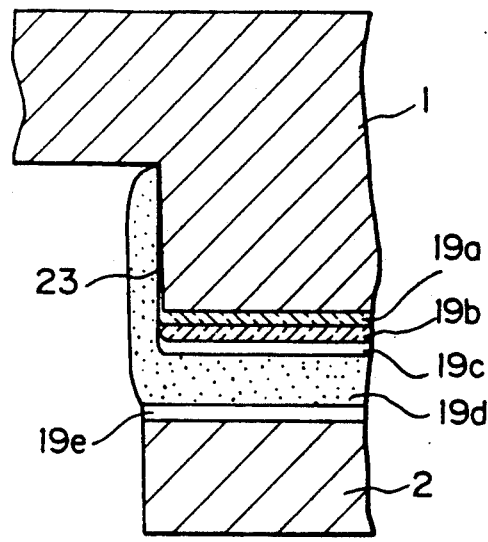
FIG. 14 is an illustration of outflow of a brazing agent on the diaphragm.

FIG. 12 is a process diagram illustrating a manufacturing process of a diaphragm. FIG. 13 is a sectional view of the manufacturing process of the diaphragm in the present invention. The manufacturing process and stages of the sensing element 1 will be shown referring to FIG. 12 and FIGS. 13A through 13G.

Forming Hole in Oxide Monocrystalline Substrate

A sapphire substrate is used as the oxide monocrystalline substrate. A through hole 12 is formed by machining with a drill, etc., at a predetermined position on the sapphire substrate 12 (refer to FIG. 13A).

Mirror Finishing

Next, the sapphire substrate 12 with the through hole 12a and another sapphire substrate 22 with no processing at all are lapped and polished for a mirror finish (not shown).

Bonding of Substrates

The mirror finished sapphire substrates 22 and 12 are bonded to each other to form a bonded substrate (refer to FIG. 13B). The bonding method will be explained later in detail.

Thinning of Substrate

Referring to FIG. 13C, the sapphire substrate at the upper side of the bonded substrate is thinned to a predetermined thickness, then is lapped and polished to give a mirror-finish on the surface. This forms the thin diaphragm 1a.

Forming Semiconductor Strain Gauge Elements

Referring to FIG. 13D, a semiconductor layer, for instance, a monocrystalline silicon layer 13', is deposited on the bonded substrate surface by vapor growth deposition. An impurity such as boron is added to make the semiconductor layer a p-type conductivity. As the method of adding the impurity, there is, one may introduce an impurity gas at the time of forming the semiconductor layer or dope the impurity by ion-injection, etc., at the time of forming the layer.

Next, referring to FIG. 13E, semiconductor strain gauge elements 13 are formed at predetermined positions on the bonded substrate by etching, etc. the p-type monocrystalline silicon layer 13' having the impurity.

Wiring of Lead Electrodes

Referring to FIG. 13F, lead electrodes made of thin metallic layers of Pt, etc., are wired. The metallic layers are formed by CVD, sputtering, vapor deposition, etc., and then fine worked to form lead electrodes 14. At the time, pad assemblies 15 made of the metallic electrodes are completed (not shown).

Forming Protective Layer

Referring to FIG. 13G, a surface protective layer 16 for passivation use is formed by CVD, sputtering, vapor deposition, etc.

Dicing

Next, sensing elements 1 as shown in FIGS. 9A and 9B are manufactured by dicing the chip into predetermined sizes.

In the above process, the dimensional accuracy of the thin diaphragm is determined by the working accuracy of the through hole at the time of forming the hole in the oxide monocrystalline substrate and by the control of the thickness of the plate at the time of thinning the substrate, so a diaphragm with a high dimensional precision can be easily obtained.

In the above, the lead electrodes 14 made of the metallic layers were wired in a specific lead electrode wiring process, but they may also be formed by semiconductors as in the case of the semiconductor strain gauge elements 13. In this case, the lead electrodes 14 can be formed at the same time of forming the semiconductor strain gauge element 13.

In the above, further, the substrates 22 and 12 were first bonded and then the substrate 22 was thinned to produce the diaphragm 1a, but it is also possible to bond the substrate 12 with the through hole to a pre-thinned substrate 22 or a substrate 22 which is thinned and then deposited with the semiconductor layer 13'. However, care is required in handling if the thin portion has a thickness less than 100 μm.

Next, the substrate bonding process of FIG. 12 will be explained. A first method for bonding is for direct bonding of the sapphire substrate. Here, the direct bonding method used in general in joining silicon wafers is applied for bonding the sapphire substrate.

First, the two mirror finished sapphire substrates are immersed in an acidic solution such as a mixture of sulfuric acid and hydrogen peroxide to give hydrophilicity and add hydroxyl groups (—OH) to the substrate surface.

When the mirror surfaces of the substrates with hydroxyl groups are brought into contact, the two substrates closely adhere by the hydrogen bonding force.

This is then dehydrated at a temperature of 200° C. to 400° C. to remove excess moisture from the bonding interface.

The assembly is then heat treated for an hour at a high temperature of 1000° C. to 1400° C., whereupon the hydroxyl groups are expelled in the form of water ($H_2O$) and the two substrates are strongly bonded at the atomic level. Note that in tests of the bonding strength of the substrates, breakage always occurred at portions other than the bond, showing the strength of the bond is equal to that of the substrates. Almost no thermal distortion occurs due to the thin thickness of the bond interface.

As a second bonding method, there is the use of an adhesive metal alkoxide solution when using a sapphire substrate as an oxide monocrystalline substrate, an aluminum triethoxide ($Al(C_2H_5O)_3$) solution or triisopropoxide solution ($Al(OC_3H_7)_3$) is utilized for forming a stable $Al_2O_3$ at the bonding surfaces.

First, a metal alkoxide solution 17 is applied by a spinner, etc., on the mirror surface sides of the substrates 22 and 12. Next, the mirror surfaces of the two substrates 22 and 12 with the metal alkoxide solution coated on them, are closely joined. Further, excess moisture at the bond interface is removed by dehydration treatment at a temperature of 200° C. to 400° C.

After dehydration, high temperature treatment of 1000° C. is applied to form stable $Al_2O_3$ at the bond interface and strongly bond the substrates to each other.

The first and second substrate bonding methods described above make it possible to securely bond the oxide monocrystalline substrates (sapphire substrate in the examples) together, so a diaphragm having a high dimensional accuracy can be easily completed.

In the above second method of bonding, the metal alkoxide solution forms $Al_2O_3$ at the bonding surface, but other solutions, for example, $Si(OC_2H_5)_4$, $Si(OCH_3)_4$, and the like may be used for forming $SiO_2$ as well.

EXAMPLE 3

In the above examples, the sensing element 1 was bonded with the metal element holder 2 by brazing, however, in the above, the metallized layer remains at the ends 2 and 3 of the concave sensing element 1. Upon brazing, the brazing material sometimes flows into the concavity of the sensing element 1. It is impossible to completely remove the metallized layer by etching, etc.

Therefore, when pressure is applied to the semiconductor strain gauge, the stress on to the gauge greatly varies depending on the state of the flow of the brazing material and the voltage output fluctuates extensively. That is, when a metallized layer is formed on the diaphragm 1a, the brazing material flows out to the diaphragm 1a, reducing the shape accuracy of the diaphragm causing fluctuation of the output of the semiconductor strain gauge elements.

Also, as above, when the sensing element 1 having the diaphragm 1a is brazed to the element holder 2, it is necessary that no metallized layer be formed in the diaphragm 1a.

The present example alleviates the above-described problem and prevents the brazing material or other bonding agent from flowing out to other members, thus providing a pressure detecting device free from deterioration of the quality of the lead electrodes.

Figure 15:
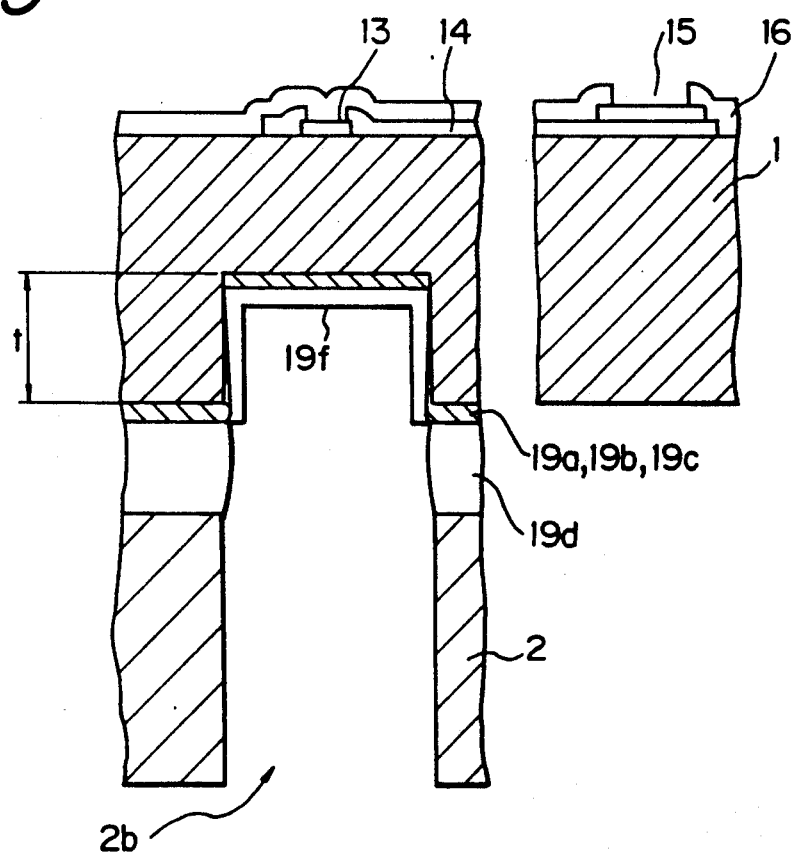
FIGS. 15 through 17 are illustrations showing a construction capable of preventing the brazing agent outflow on the diaphragm.

FIG. 15 is an illustration of a preferred example of a construction capable of preventing the flow of a brazing material into the diaphragm.

Here, the pressure detecting device comprises an element holder 2 including a through hole 2b at a predetermined position; a substrate 1 having a diaphragm 1a at a predetermined position, the substrate 1 bonded to the element holder 2 by a bonding agent 19d; a flow hold layer 19f for preventing flow of the bonding agent into the diaphragm, the layer having a low cowetting property with said bonding agent 19d, and being formed at the side of the diaphragm facing the through hole, and semiconductor strain gauge elements positioned at an opposite end from the diaphragm with the flow hold layer.

Due to the above construction, since the flow hold layer having a low cowetting property with said bonding agent is formed at the surface of the diaphragm facing the through hole, it prevents the bonding agent from flowing into the diaphragm.

Since the flow hold layer prevents a flow of the bonding agent into the diaphragm, when pressure is applied the variation on the stress on the semiconductor strain gauge is reduced.

As a result, fluctuation of the output from the semiconductor strain gauge elements is also suppressed.

The example will be explained in more detail below.

Figure 16:
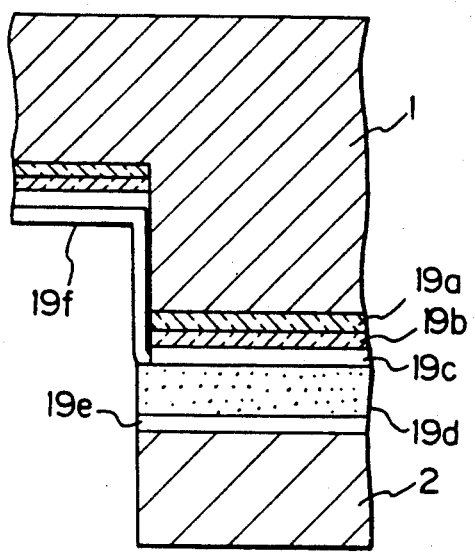

FIG. 16 also illustrates a construction capable of preventing the flow of brazing material into the diaphragm. In the drawing, a Ti other metallized layer 19a, an Mo or other metallized layer 19b, and an Ni or other metallized layer 19c are formed between the back surface the sensing element 1 and a contact surface of the element holder 2. The flow hold layer 19f (hereinunder referred to as the insulative layer) is formed within a concavity (pressure receiving diaphragm 1a) at the back surface of the sensing element 1. The back surface of the sensing element 1 and the element holder are securely bonded by a brazing layer 19a in a state preventing the brazing material (Ag wax) of the brazing layer 19d from flowing out to the groove. An Ni plating layer 19e is formed at the brazing portion of the element holder 2, as well, and this strengthens the brazing bond. The insulative layer 19f is formed with material having a low cowetting property such as $SiO_2$ or $Si_3N_4$.

Since the insulative layer 19f is provided in the concavity of the sensing element 1, flow of the brazing material into the concavity can be prevented. Therefore, the shape accuracy of the diaphragm 1a can be controlled when the concavity of the diaphragm is made from the sapphire substrate 11, so the variation in stress on the semiconductor strain gauge elements 13a and 13b formed on the surface of the diaphragm becomes extremely small, so the fluctuation in output from the gauge elements also becomes extremely small.

The above prevents flow of the brazing material into the concavity. This also reduces thermal stress generated from the difference in the heat expansion coefficients of the brazing material Ag and sapphire or substance forming the insulative layer (flow hold layer).

A metallized layer is provided also at the back side of the diaphragm. The metallized layer is electrically connected to the element holder 2 through the metallized layers 19a, 19b, 19c, and the brazing layer 19d. This enables the electromagnetic wave applied to the back surface of the diaphragm to escape to the element holder 2.

Figure 17:
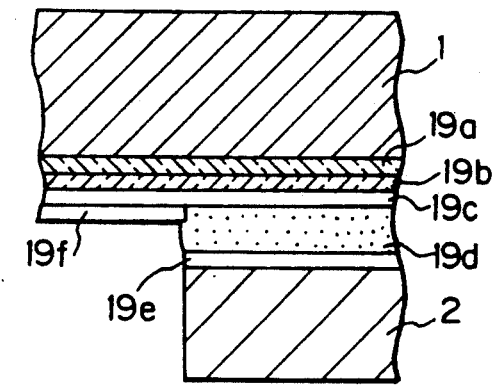

FIG. 17 is another illustration of a construction capable of preventing the brazing material from flowing to the diaphragm. Referring to FIG. 17, since the diaphragm portion is not shielded, electromagnetic waves may pass through. In this case, erroneous detection may occur since noise occurs at the gauge resistors of the semiconductor strain gauge elements on the diaphragm. Therefore, measures against noise due to electromagnetic waves would be effective.

FIGS. 18A to 18F illustrate of the manufacturing process of the diaphragm and the lead wire outlet of the pressure detecting device shown in FIG. 15. FIG. 15 is a sectional view of the diaphragm and the lead wire outlet showing the principle construction of a concrete example.

First, a semiconductor layer, for instance, a monocrystalline layer, is deposited on a sapphire substrate 1 by vapor growth deposition or the like. Then, an impurity such as boron is added to make the semiconductor layer a p-type.

Figure 18:
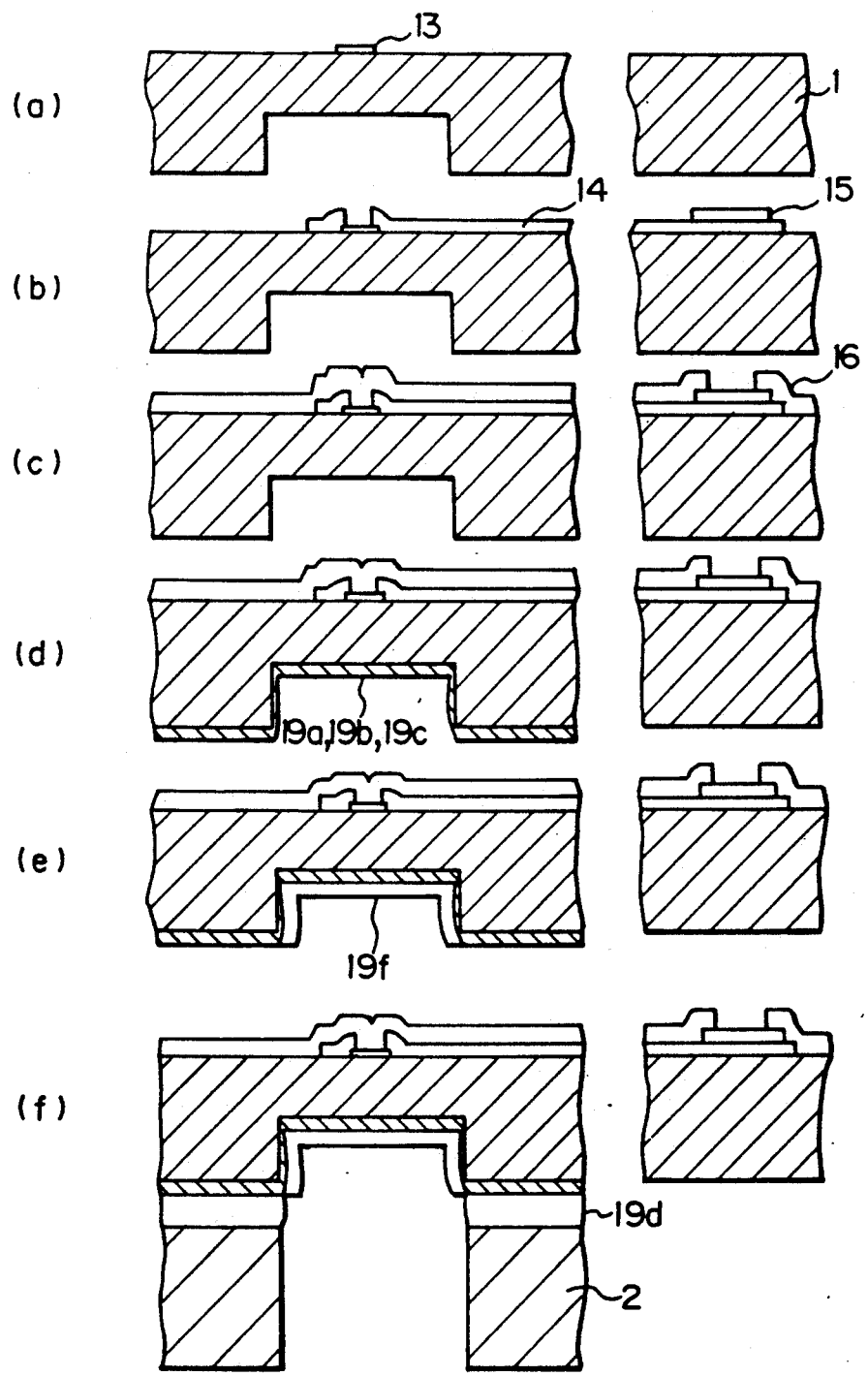
FIGS. 18a-18f are an illustration of the manufacturing process of the diaphragm as shown in FIGS. 15 through 17 in the present invention.

Next, the p-type semiconductor layer with the impurity is fine worked by etching to form semiconductor strain gauge elements at predetermined positions on the surface of the sapphire substrate, as shown in FIG. 18A.

Referring to FIG. 18B, a metallic layer, for instance, of Pt is formed by vapor deposition sputtering, CVD, and so forth. Then, the lead electrodes 14 are formed by fine working. Simultaneously, the pad assemblies 15 including the metallic electrodes are formed.

As shown in FIG. 18C, a passivation use surface protective layer 16 having a through hole for electrical connection is deposited on the pad assemblies 15 by means of vapor deposition, sputtering, CVD, SOG and the like.

Referring to FIGS. 18D and 16, a Ti metallized layer 19a, Mo metallized layer 19b, and Ni metallized layer 19c are formed by vapor deposition, sputtering, CVD, and the like.

In FIG. 18E, an insulative layer 19f such as $Si_3N_4$ or $SiO_2$ is formed selectively on the entire surface of the concavity of the sapphire substrate 1, for example, by CVD or SOG.

As shown in FIG. 18F, the sapphire substrate 1 and the element holder 2 are securely bonded to each other by a brazing layer 19d (brazing material of, for instance, Ag). The brazing atmosphere is a reducing atmosphere filled with a very small amount of hydrogen gas or a vacuum atmosphere lower than $10^{-2}$ Torr.

The manufacturing process described above enables a pressure detecting device having a diaphragm and the lead outlet as shown in FIG. 15.

Since the brazing layer 19d does not flow into the concavity of the sapphire substrate 1, when pressure is applied, the stress on the thin diaphragm 1a is determined by the dimensions of the diaphragm 1a. Therefore, the stress value can be easily controlled by ensuring working accuracy of the shape of the diaphragm 1a. Since the brazing layer 19d having a large heat expansion coefficient does not flow into the concavity, the thermal stress arising from the difference of the hot expansion coefficients of the brazing material and the sensing element can be reduced by increasing the thickness "t" (FIG. 15) of the end of the concavity of the sensor element.

In a case of a sensing element without a concavity, when bonding the rear side of the diaphragm with the metallic holder 2, it is easy to prevent brazing material from flowing using the insulative layer 19f. In the above example, further, it is unnecessary to perform etching of the metallized layers 19a, 19b, 19c for depositing an insulative layer 19t, so the process is extraordinarily simplified.

The wiring of the lead electrodes may be made, after completion of the semiconductor strain gauge elements on the sapphire substrate, by forming layers of metal having a high melting point such as molybdenum silicate and tungsten silicate on one end of the semiconductor strain gauge elements 13.

In a high temperature atmosphere (in brazing by Ag, 650° to 850° C.) at the time of brazing the sensing element 1 with the element holder 2, a chemical reaction occurs between the semiconductor strain gauge elements and the Pt, Al, Au, etc., used for semiconductor electrodes, so deterioration of the electrodes greatly increases. Therefore, it is desired to realize an electrode structure which can prevent such deterioration.

To deal with the above problem, a layer 17 of metal having a high melting point, for instance, molybdenum silicate, is formed as a barrier layer. In the above case, the barrier layer must be formed before the Pt lead electrodes 14, etc.

When the semiconductor strain gauge elements 13 are made of monocrystalline silicon, it is preferable to use nickel silicate for the (100) plane, and platinum silicate for the (111) plane for layers capable of epitaxial growth.

Figure 19:
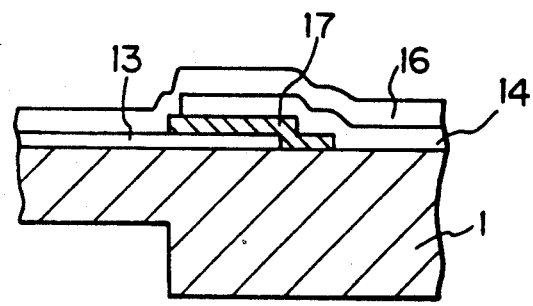
FIG. 19 is an illustration of a construction wherein a barrier layer is formed on a wiring end.

FIG. 19 illustrates a construction wherein a barrier layer is formed on a wiring end. After heat treatment, metallic wiring, that is, the lead electrodes 14, are formed, then the surface protective layer 16 is formed.

In the above examples, although sapphire is used as an insulative layer, an oxide monocrystalline substrate, for instance, spinel or magnesia can also be applied. The invention is not limited to "sapphire".

EXAMPLE 4

In the above examples, the pressure detecting device is constituted by using a rectangular parallelopiped shape for the sensing element and ensuring a predetermined distance between the diaphragm 1a and the lead wire outlet 1b, so the lead wire outlet does not suffer deterioration due to high temperature.

While such a construction is advantageous, some points still require improvement to eliminate the influence of the high temperature atmosphere. A concrete example is provided here for further reducing deterioration in a sensing element 1 exposed to a high temperature and high pressure atmosphere.

Figure 20:
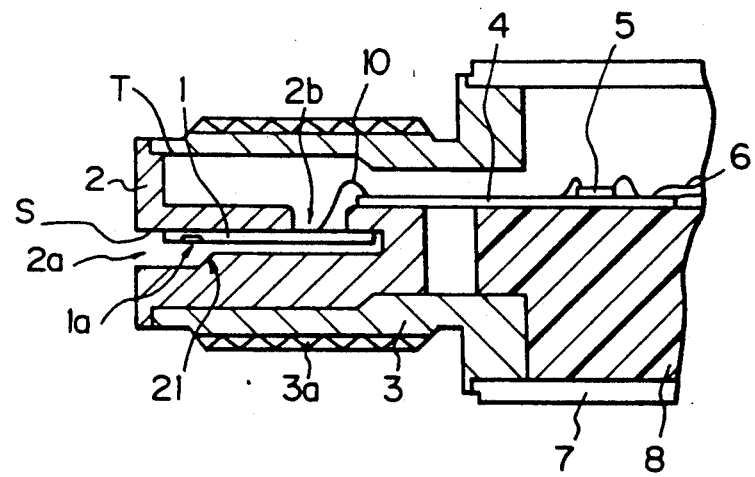
FIG. 20 is a sectional view illustrating another embodiment of a pressure detecting device according to the present invention.

FIG. 20 is a sectional view illustrating this example. The pressure detecting device comprises: a housing having a space therein wherein a front T faces the inside of a pressure chamber; an element holder 2 held airtightly at the front T of the housing 3 and including a pressure conducting passage 2a at one end; and a sensing element 1 fixed at a predetermined position within the pressure conducting passage 2a and having a diaphragm 19 to which are bonded semiconductor strain gauge elements 13 for detecting fluid pressure conducted into the passage 2a. The pressure conducting passage 2a of the element holder 2 has a sectional area which is reduced from a fluid conducting inlet toward the inner part. An opening 2b is disposed on the side wall of the inner part having the smaller sectional area in the pressure passage 2a and communicates to the inside of the housing 3.

While FIG. 20 indicates an example wherein the sensing element 1 is mounted on the inside wall S of the pressure conducting passage 2a, the sensing element 1 can also be mounted on the outside surface of the sensing element 2 exposed to the space formed with the housing 3 and the element holder 2, as shown in FIG. 2A. Due to this, even if a high temperature pressure fluid is conducted into the pressure conducting passage 2a, a quenching effect arises and suppresses the action of the heat of the high temperature fluid on the lead wire outlet region, since the lead wire outlet region is arranged at the inner part of the pressure conducting passage. Therefore, it is possible to prevent deterioration of the reliability of the lead outlet region due to high temperatures.

Referring again to FIG. 20, the sectional area of the pressure conducting passage 2a is sharply reduced at reference number 21. However, in this example, it is not necessary to determine any particular limited way as to at what position of the pressure conducting passage 2a the sectional area must be sharply reduced or as to what degree the sectional area of the passage 2a must be reduced.

EXAMPLE 5

Examples 1 to 3 showed the sensing element 1 secured on the outer surface of the element holder 2, that is, secured in the space between the housing 3 and the outer surface of the element holder 2 opposite to the high pressure passage. In Example 4, the sensing element 1 may be disposed on the inner wall S of the pressure conducting passage 2a. However, the sensing element preferably has a particular shape and construction adapted to this. In this example, a sensing element suitable for use in Example 4 will be explained.

The sensing element in FIG. 20, as clear from the drawing, is secured on the inner wall S of the pressure conducting passage 2a. The opening 2b is sealed to maintain air-tight the space between the housing 3 and the element holder 2.

The sensing element is box shaped and is thinned at a portion of its bottom wall to form a diaphragm 1a. Semiconductor strain gauge elements 13 are formed on the inside surface of the sensing element 1 on the side opposite the diaphragm pressure receiving surface. Lead electrodes 14 are formed by a semiconductor the same as of the semiconductor strain gauge elements from the electrodes to the lead wire outlets 1b at the other end of the sensing element. A cover 32 having a hollow configuration is provided to cover the entire bottom wall as shown in FIGS. 21 and 22.

Figure 21:
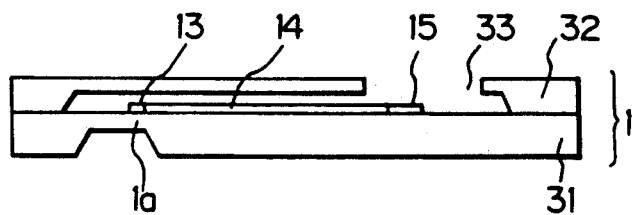
FIGS. 21 through 23 are illustrations of another example of a sensing element according to the present invention.
Figure 22:
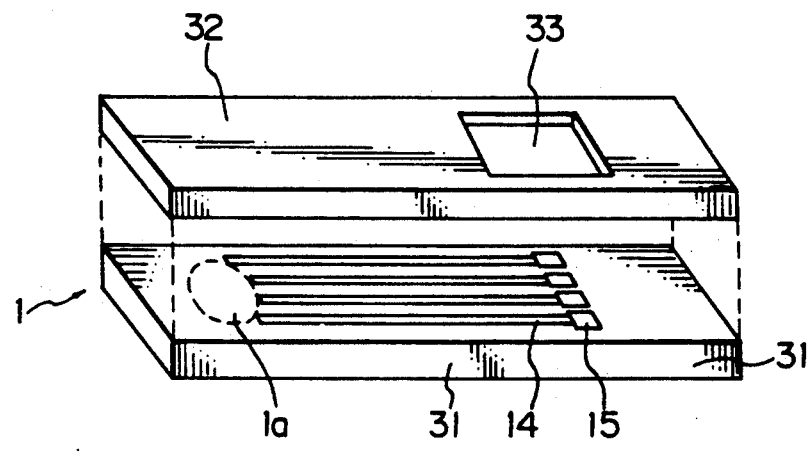
Figure 23:
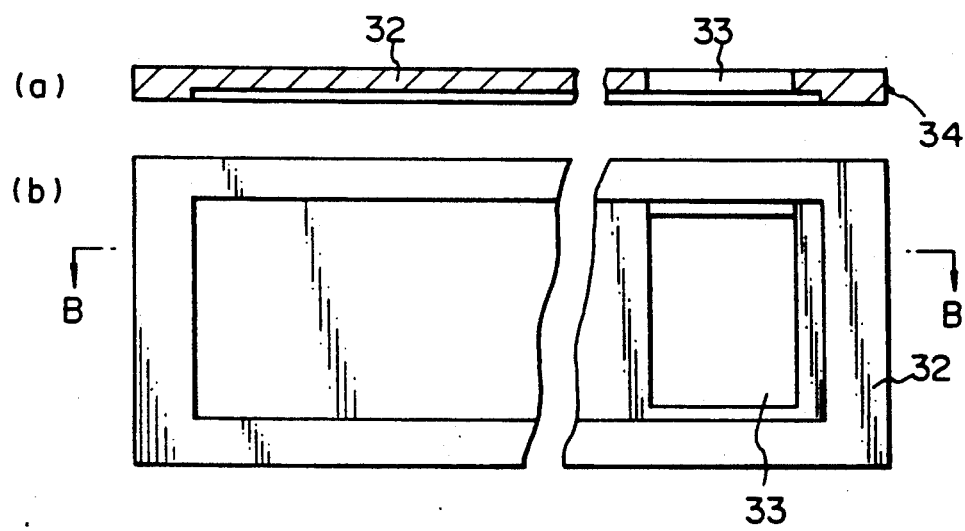

FIGS. 21 to 23 are illustrations of another example of a sensing element according to the present invention.

The above described members formed on the bottom wall 31 are covered by the hollow cover 32 with a specified space. As shown in FIG. 23, an opening 33 for taking out lead wires is provided in the hollow cover 32. It is preferable that the largeness of the opening 33 be equal to that of the opening 2b in the element holder.

The sensing element 1 is secured on the inner wall S of the pressure conducting passage 2a by glass bonding, etc. on the outer surface of the hollow cover 32 so that the opening 33 matches the opening 2b.

The pad assembly 5 of the lead outlet 1b passes through the opening 33 and the opening 2b and is connected to a specified processing unit by a wire 10.

The semiconductor strain gauge elements 13, wiring 14, pad assembly 15, and so forth on the bottom wall 31 of the sensing element 1 may have the same arrangement, shape and wiring pattern as in FIG. 3 or 9. An SOI structure is preferably applied interposing an insulative layer between the bottom wall and the semiconductor strain gauge.

On the other hand, the hollow cover 32 may be etched inward at the end at the side opposite to a bonding face with the element holder 2 as shown in FIGS. 23A and 23B, so as to form a circumferential edge bonding face with the bottom wall 31. The sensing element 1 is formed by bonding the bottom wall 31 and hollow cover 32 at the bonding face 34. As the bonding method, there are Si—Si direct bonding and Si-$O_2$—$SiO_2$ bonding after the Si surface is oxidized.

As a concrete example, a first silicon wafer comprising the bottom wall of the sensing element given certain processing and formed with elements thereon, and a second silicon wafer comprising the hollow cover 32 given certain processing are treated for hydrophilicity, dehydrated at a high temperature atmosphere to bond, and then are diced to form sensing elements.

The thus processed sensing element 1 is sealed airtight to the element holder 2. At this time, the lead outlet uses the small opening 2b disposed in the side wall of a pressure passage port 2a and is positioned at a lead outlet hole 12b arranged in the sensing element 1.

Next, referring to FIG. 20, a step 21 is provided on the inner wall S of the pressure passage 2a of the element holder 2. The passage 2a is constructed narrower at the inner part thereof compared with an entrance thereof. Since the sensing element 1 is secured to cover on the inside wall of the pressure passage port 2a, the clearance is extremely narrow at the small opening 2b, that is, the lead outlet region of the sensing element 1. The diaphragm 11a serving a receiver of the sensing element 1 comes close to an inlet of the passage 2a in construction.

A lead plate 4 is secured by bonding on an opposite side end to the pressure passage port 2a with respect to the element holder 2. The sensing element 1 and the lead plate 4 are electrically connected with each other through the small opening 2b by a wire 10.

To the wire lead 10 is bonded a circuit chip 5 for amplifying signals and for compensating for temperature. Further, the wire lead 10 is connected to a lead wire 6 for taking an output signal of the circuit chip 5 to the outside.

The operation of the example will be explained referring to the above described construction of the device.

Assume that, as shown in FIG. 2C, the pressure detecting device is secured on a wall of a combustion chamber of an internal combustion engine by the use of a threaded portion 3a provided on the housing 3 and that the pressure passage port 2a faces the inside of the combustion chamber. The receiving face of the pressure receiving diaphragm 1a arranged in the sensing element 1 is exposed to a high temperature and high pressure fluid (maximum temperature 400° to 500° C., maximum pressure 100 kgf/cm$^2$) within the combustion chamber because the pressure receiving face is positioned at a large opening adjacent to an inlet of the pressure passage port 2a.

When pressure acts on the diaphragm 1a, the diaphragm 1a deforms corresponding to pressure, and the resistance values 11 to 14 of the semiconductor strain gauge elements arranged at the opposite side end to the receiving face, vary as a consequence, the balance of the bridge circuit as shown in FIG. 5 varies, and the output at the lead electrodes corresponds to pressure exerted on the diaphragm 1a. The thus obtained output is input through wire lead 10 and the lead plate 4 to the circuit chip 5, and after processing for amplifying and temperature compensation, is taken out by the lead wire 6.

In this case, the pressure passage port 2a is sharply narrowed by the step 21 adjacent to the small opening 2b, that is, the lead wire outlet region of the sensing element 1, and then a temperature rise is suppressed because the combustion flame hardly enters due to the quenching effect. As a result of the above, the bonding assembly can be prevented from deterioration caused by high temperatures and the reliability of the bonding assembly can be maintained even in such a high temperature condition.

The diaphragm 1a is exposed to a high temperature and high pressure atmosphere. Also, in this case, by separating components by insulation using an SOI structure for forming the semiconductor strain gauge elements via the insulative layer, no PN junction is provided; there is no problem if PN junctions generate leakage current depending temperature rise; and high pressure measurement under a high temperature can be performed with a high sensitivity.

Since, in the sensing element 1, the element holder 2 receives compressive force by the high pressure in the combustion chamber, the bonding strength can be guaranteed between the sensing element 1 and the element holder 2, and, further, a high sealing property can be maintained even if the bonding strength between the sensing element 1 and the element holder 2 is low.

Two silicon chips are bonded with each other in the sensing element 1 as described above, and thus the semiconductor strain gauge, the lead electrodes, and the other components are incorporated between the sensing element 1 and the element holder 2. Due to this construction, it becomes easy to bond the sensing element 1 with the element holder 2.

Figure 24:
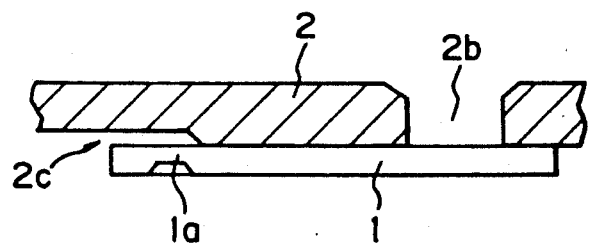
FIG. 24 is an illustration of another example of a bonding assembly of a sensing element and an element holder in a pressure detecting device according to the present invention.

FIG. 24 is an illustration of another example of a bonding assembly of a sensing element and an element holder. In this example, the element holder 2 contacts the entire upper surface of the hollow cover 32 of the sensing element 1. As shown in FIG. 24, in order to prevent contact of the element holder 2 with the pressure receiving end in the longitudinal direction of the rectangular parallelopiped of the sensing element 1, a relied part 2c may be formed at the element holder 2. From this, stress arising upon bonding is prevented from directly acting on both the semiconductor strain gauge elements, and the thin portion formed by the diaphragm, that is, a detecting portion, and there can be proposed a pressure detecting device capable of obtaining more stable output.

It is preferable that, in a case where the sensing element is arranged within the pressure passage, a chip end of the sensing element itself may be selected to be thin.

In the respective examples in the present invention, the element holder must be bonded with the sensing element, and therefore, the opening of the element holder is reliably sealed by the sensing element. This enables a high sealing property.

We claim:

1. A pressure detecting device for measuring combustion pressure in an internal combustion engine which directly faces an inside of a pressure chamber thereof, including a pressurized fluid at a high temperature and high pressure atmosphere, comprising:

a cylindrical housing having a front end thereof which is arranged to be inside said pressure chamber;

an element holder for supporting a sensing element on a surface thereof which is held at the front end of said cylindrical housing, said element holder constituting a pressure passage by which said pressurized fluid is conducted into said housing;

said sensing element comprising semiconductor strain gauge elements for detecting pressures of said pressurized fluid conducted into said pressure passage;

said sensing element being secured on a surface of said element holder and which has a one main surface on which a pressure receiving diaphragm is provided and on which said semiconductor strain gauge elements are formed, said sensing element having a rectangular parallelopiped configuration which extends in a longitudinal direction so that a first end and a second end are opposed at a predetermined interval in the longitudinal direction of said parallelopiped configuration and a longitudinal axis thereof being arranged in parallel with a longitudinal axis of said pressure passage;

an outlet of a lead wire which is arranged adjacent to said second end of said sensing element located spaced from said front end of said pressure passage and at a specific distance from said pressure receiving diaphragm so as to prevent deterioration of said lead wire, bonding wires or connecting portions formed therebetween caused by the temperature of said pressurized fluid; and wiring means for connecting said semiconductor strain gauge elements disposed in said pressure receiving diaphragm and said lead wire outlet, said wiring means formed on a surface of said element holder.

2. A pressure detecting device as claimed in claim 1, wherein said sensing element is secured by bonding at least at a first end to said element holder so that the longitudinal direction thereof conforms with the pressure conducting direction of said pressure conducting passage formed by said element holder.

3. A pressure detecting device as claimed in claim 2, wherein, said sensing element is in contact with a surface of said sensing element holder, facing an inside of a space formed between said sensing element holder and said housing by bonding, so that a one main surface of said sensing element opposite to another main surface thereof on which said semiconductor strain gauge element is secured, and wherein an opening which communicates between said pressure receiving diaphragm and said pressure conducting passage is disposed in said element holder corresponding to a position of said pressure receiving diaphragm in said sensing element.

4. A pressure detecting device as claimed in claim 3, wherein said element holder comprises a metallic substance and said sensing element an oxide monocrystalline substance.

5. A pressure detecting device as claimed in claim 4, wherein a metallic substance such as a Fe-Ni-Co alloy forms said element holder.

6. A pressure detecting device as claimed in claim 4, wherein oxide monocrystalline substance forming said sensing element is sapphire having a heat expansion coefficient approximating that of Fe-Ni-Co alloys.

7. A pressure detecting device as claimed in claim 4, wherein a wiring is formed by a thin metallic layer and wherein a barrier layer of metal with a high melting point is formed at junctions between said wiring and said semiconductor strain gauge elements.

8. A pressure detecting device as claimed in claim 7, wherein said barrier layer includes nickel silicate as metal having a high melting point.

9. A pressure detecting device as claimed in claim 7, wherein said semiconductor strain gauge elements include monocrystalline substances and have a planar orientation (100).

10. A pressure detecting device as claimed in claim 3, wherein said sensing element is bonded through a brazing layer of said element holder and a brazing material.

11. A pressure detecting device as claimed in claim 10, wherein said sensing element is bonded through a metallized layer and said brazing layer to said element holder.

12. A pressure detecting device as claimed in claim 10, wherein,
a flow hold layer is provided for preventing said brazing material from flowing into a main surface of said sensing element including said pressure receiving diaphragm,
said flow hold layer having a low cowetting property to said brazing material,
said flow hold layer is formed on a surface of said sensing element and in contact with said element holder, and
said main surface opposes said opening of said element holder.

13. A pressure detecting device as claimed in claim 12, wherein said brazing material is Ag and said flow hold layer is made from silicon nitride.

14. A pressure detecting device as claim in claim 2, said sensing element has a rectangular parallelopiped configuration and is secured on the inside wall of said pressure passage so that said first end of said sensing element is disposed adjacent to an inlet of said pressure passage and so that said second end of said sensing element is disposed at an inner part of said pressure passage;
said pressure passage of said element holder having a sectional area sequentially narrower from said inlet toward said inner part;
an opening which is disposed on said side wall of said pressure passage so as to communicate a lead wire outlet arranged at a second end of said sensing element to an inside space enclosed by said element holder and said housing.

15. A pressure detecting device as claimed in claim 1, wherein said pressure detecting device comprises:
a hollow cover which covers said semiconductor strain gauge elements, wiring, and said outlet of the lead wire, each arranged on one main surface of said sensing element;
said semiconductor strain gauge element being covered by said hollow cover with a space therebetween.

16. A pressure detecting device as claimed in claim 15, wherein an opening is disposed in a part of said hollow cover and said lead wire outlet is connected by said wiring passing through said opening.

17. A pressure detecting device as claimed in claim 15, wherein
said sensing element has a rectangular parallelepiped configuration and said sensing element is bonded to the inside wall of said pressure conducting passage through said hollow cover having said rectangular parallelepiped configuration.

18. A pressure detecting device as claimed in claim 17, wherein:
said pressure receiving diaphragm is produced by attenuating thickness of a part of a bottom wall of said rectangular parallelepiped sensing element and adjacet to said first end of said sensing element and;
said semiconductor strain gauge elements is formed on a surface thereof facing to an inside space of said sensing element opposite to the surface on which a pressure receiving surface of said pressure receiving diaphragm is provided and a wiring is extendedly formed from said semiconductor strain guage element to said lead wire outlet provided at said second end of said sensing element and arranged on the surface thereof facing an inside space formed by said hollow cover.

19. A pressure detecting device as claimed in claim 17, wherein said element holder is made of metallic substance and said sensing element is made of silicon while said sensing element being bonded to said element holder by glass bonding procedure.

20. A pressure detecting device as claimed in claim 17, wherein
said semiconductor strain gauge elements and a wiring are formed on a sensing element made of silicon,
an insulative layer exists between said semiconductor strain gauge elements and said sensing element.

21. A pressure detecting device for measuring pressure of a high temperature fluid according to claim 1, wherein a pressure receiving aperture is provided inside a surface of said pressure passage of said element holder, and a pressure receiving diaphragm provided on said sensing element is disposed at a portion of said element holder opposite said pressure receiving aperture.

22. A pressure detecting device for measuring a combustion pressure in an internal combustion engine which directly faces an inside of a pressure chamber thereof, including a pressurized fluid in a high temperature and pressure atmosphere, comprising:
a cylindrical housing wherein a front end thereof is arranged to be inside said pressure chamber;
an element holder made of metal for supporting a sensing element on a surface thereof which is held at the front end of said cylindrical housing, said element holder constituting a pressure passage by which said pressurized fluid is conducted into said housing;

said sensing element comprising semiconductor strain gauge elements for detecting pressures of said pressurized fluid conducted into said pressure passage;

said sensing element made of an oxide-monocrystalline substrate and which is secured on a surface of said element holder and which has one main surface on which a pressure receiving diaphragm is provided, in which said semiconductor strain gauge elements, made of monocrystalline silicon, are formed, said sensing element having a rectangular parallelopiped configuration which extends in a longitudinal direction so that a first end and a second end are opposed at a predetermined interval in the longitudinal direction of said parallelopiped configuration and a longitudinal axis thereof being arranged in parallel with a longitudinal axis of said pressure passage;

an outlet of a lead wire which is arranged adjacent to said second end of said sensing element at a specific distance from said pressure receiving diaphragm so as to prevent deterioration of said lead wire, bonding wires or connecting portions formed therebetween caused by the temperature of said pressurized fluids; and wiring means for connecting said semiconductor strain gauge elements disposed in said pressure receiving diaphragm and said lead wire outlet.

* * * * *